United States Patent
Garthwaite et al.

(10) Patent No.: US 8,041,918 B2
(45) Date of Patent: Oct. 18, 2011

(54) METHOD AND APPARATUS FOR IMPROVING PARALLEL MARKING GARBAGE COLLECTORS THAT USE EXTERNAL BITMAPS

(75) Inventors: Alexander T. Garthwaite, Beverly, MA (US); Antonios Printezis, Burlington, MA (US)

(73) Assignee: Oracle America, Inc., Redwood City, CA (US)

( * ) Notice: Subject to any disclaimer, the term of this patent is extended or adjusted under 35 U.S.C. 154(b) by 396 days.

(21) Appl. No.: 12/416,043

(22) Filed: Mar. 31, 2009

(65) Prior Publication Data

US 2009/0248766 A1    Oct. 1, 2009

Related U.S. Application Data

(63) Continuation of application No. 11/091,611, filed on Mar. 28, 2005, now abandoned.

(51) Int. Cl.
*G06F 12/00* (2006.01)

(52) U.S. Cl. .......... 711/170; 707/813; 707/815; 711/132
(58) Field of Classification Search ........... 711/118–132
See application file for complete search history.

(56) References Cited

U.S. PATENT DOCUMENTS 7,197,521 B2 * 3/2007 Subramoney et al. ................. 1/1
2001/0039609 A1 * 11/2001 Houldsworth ................ 711/170

* cited by examiner

*Primary Examiner* — Reginald Bragdon
*Assistant Examiner* — Gurtej Bansal
(74) *Attorney, Agent, or Firm* — Osha • Liang LLP

(57) ABSTRACT

A method for performing garbage collection involves obtaining a first reference bitmap including a block address and a set of mark bits, obtaining a first reference, identifying a mark bit of the set of mark bits based on the first reference, comparing an address associated with the mark bit with the first reference to generate a comparison, selecting an existing word from a global bit map based on the block address and the comparison, calculating a new word based on the set of mark bits and the existing word, replacing the existing word in the global bit map with the new word, and reclaiming a block of memory for reuse based on the global bit map after replacing the existing word.

18 Claims, 6 Drawing Sheets

METHOD AND APPARATUS FOR IMPROVING PARALLEL MARKING GARBAGE COLLECTORS THAT USE EXTERNAL BITMAPS

CROSS-REFERENCE TO RELATED APPLICATIONS

This application is a continuation of U.S. patent application Ser. No. 11/091,611, entitled: "METHOD AND APPARATUS FOR IMPROVING PARALLEL MARKING GARBAGE COLLECTORS THAT USE EXTERNAL BITMAPS", and filed on Mar. 28, 2005. Accordingly, this application claims benefit from U.S. patent application Ser. No. 11/091,611 under 35 U.S.C. §120.

BACKGROUND

This invention relates to garbage collectors that mark live objects using a bitmap structure and, more particularly, to the use of bitmap marking garbage collectors that employ parallel marking. In general, memory reclamation may be carried out by a special purpose garbage collection algorithm that locates and reclaims memory which is unused, but has not been explicitly de-allocated. There are many known garbage collection algorithms, including reference counting, mark-sweep, mark-compaction and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996.

An object may be located by a "reference", or a small amount of information that can be used to access the object data structure. Objects can themselves contain references to yet other objects. In this manner, a chain of references can be created, each reference pointing to an object which, in turn, points to another object. Some garbage collection techniques determine when a data structure is reachable by an executing program thread by starting at external roots (for example, program stack entries) and following chains of references and marking all objects encountered. After all reference chains have been followed, the memory occupied by unmarked objects can be reclaimed and reused. Object marking may be carried out by a single collector thread or may be carried out by several collector threads operating in parallel. Reclamation of unused memory is generally performed during a "sweep" phase of garbage collection that follows the marking phase.

To follow chains of references from the program's roots and to mark all reachable objects, each marking thread must track the objects it marks and scan them, in turn, for references. Typically, this objective is achieved with a local mark stack that manages the objects that have been marked, but not yet scanned. As objects are marked, they are pushed on the local mark stack. When an object is popped off the stack, its references are examined and any unmarked objects are marked and pushed on the stack. When all the roots have been scanned and the local mark stacks are empty, all reachable objects are marked.

There are generally two approaches to marking objects. The first approach uses a marking data structure, such as a bitmap, that is "external" or separate from the memory occupied by the objects. The bitmap typically contains one bit for each address where an object may start and is indexed by the address of the object. Objects allocated in a garbage-collected heap typically have a minimum alignment which limits the set of addresses at which objects may start. Common constraints include a minimum alignment on either single- or double-word boundaries which result in the possibility of objects starting on every word or on every two words, respectively. In the former case, we need one bit for each word of memory; in the latter, one bit is needed for every two words. Each block of memory corresponding to a bit in the bitmap is referred to as a "unit of memory".

The second approach, called "inline" marking, uses memory space reserved in the data structure for each object to store the marking bit. Each marking approach has advantages. For example, in uniprocessor systems, external marking data structures typically have better locality, allow for less expensive sweep operations, and provide a natural data structure for overflowing mark stacks. Alternatively, inline marking requires no additional memory (for the external structures), typically requires a bit per object instead of a bit per unit of memory, has a simpler marking operation (tagging and storing a reference rather than indexing a bitmap).

Because the average object size is typically 40-64 bytes and because marking threads are usually marking different subsets of objects, the approach of marking objects inline tends to disperse the marking activity so that two marking threads rarely mark two objects in the same cache line. This property is not true for the approach of marking objects in a single external bitmap because the marking information is represented in a more compact format. Because hundreds of mark-bits fit on the typical cache line, which for most modern processors ranges from 64 to 256 bytes, multiple marking threads are more likely to write locations in the same cache lines as so contend with each other during the accessing of the cache lines.

One challenge when employing external bitmaps for marking objects is that modern computer instruction sets typically do not provide instructions to independently write single bits. Instead, a thread must read a larger unit of memory, such as a word, set the appropriate bit in that word, and write back the result. If this write-back is performed with an ordinary store instruction, the thread risks losing information about bits set by other threads in the same word of memory. For this reason, a marking thread writing to a shared bitmap typically uses atomic instructions such as compare-and-swap, swap, or load-locked/store-conditional instructions that enable it to detect updates made by other threads to the same sequence of bits. If two marking threads attempt to write the same word simultaneously, one thread may have to retry the operation causing a delay. Contention for highly referenced portions of the shared bitmap can cause significant delays for multiple marking threads.

Conventional parallel marking systems have dealt with this problem by using a variety of techniques. For example, some systems use a coarser representation, such as a single shared byte-map where each individual mark can be written separately into the map structure. Other systems replicate the bitmap so that the marking threads work on separate copies. Still other systems partition the bitmap and index it with addresses so that threads work on a single bitmap, but mark disjoint sets of objects.

However, some of these conventional techniques lead to the possibility of duplicate work. For example, if ordinary non-atomic byte-store instructions are used to update the map, multiple threads may think they have marked a particular object, since, in this case, marking is an idempotent operation. Atomic update instructions can be used on bytes to eliminate the duplicate work but then the instruction cost for writing each mark is much greater than non-atomic update instructions (40-50 cycles versus one cycle). Using replicated bitmaps can also allow multiple threads to mark an object unless each thread incurs the expense of checking how the object is marked in all of the replicated copies of the bitmap.

Some of these techniques also require extra communication and synchronization operations among the marking threads. For example, with a partitioned bitmap, each thread must communicate references found in its partition to objects in partitions updated by other threads. In the worst case, in such systems, linking patterns of objects in the heap can effectively serialize the marking of all the parallel threads. Finally, the use of byte-maps and replicated bitmaps increase the space used and replicated bitmaps require an ORing of bits across all the replicated bitmap copies to determine if an object is marked.

In addition, in collectors that use non-atomic operations to mark and claim objects to scan, the objects can end up on multiple mark stacks. Their presence on multiple stacks, in turn, limits what can be done with those objects safely. For example, some overflow strategies for mark stacks involve threading overflowed objects through their class pointers; a strategy which nicely summarizes the excess work with no additional space overhead. However, objects on overflow lists no longer have references to their class information in their headers. If an object can be on multiple stacks, and it is placed on an overflow list by one marking thread, other marking threads whose mark stacks contain that object will have difficulty scanning that object without its class information.

SUMMARY

In accordance with the principles of the invention, a single unified external global bitmap is used to eliminate duplicate work, but the frequency at which the global bitmap is updated is reduced by employing a private mark-cache for each parallel collector thread. During the marking process, rather than directly updating the global bitmap to mark an object, each collector thread places marks only in its private mark-cache. The contents of the mark-caches are then used to update the global bitmap.

In accordance with one embodiment, only when a collision occurs in a mark-cache and an entry is evicted from the mark-cache or the associated thread finishes marking (its mark stack is empty) are the contents of the mark-cache used to update the global bitmap.

In accordance with another embodiment, each mark-cache is managed by a direct mapping arrangement in which each mark cache comprises a plurality of entries where each entry, in turn, comprises a pair of a base address and a bitmap for a small, aligned block of memory. The base address indicates the start of the memory block and the bitmap stores marks for each object that could possibly be located in the memory block.

In accordance with yet another embodiment, each collector thread scans objects to identify references to other objects in the scanned objects and the contents of the mark-cache associated with that thread and the global bitmap are used to locate further objects that must be scanned for references.

In accordance with still another embodiment, updates to the mark-caches are performed with non-atomic operations whereas updates to the global bitmap are performed with atomic operations.

BRIEF DESCRIPTION OF THE DRAWINGS

The above and further advantages of the invention may be better understood by referring to the following description in conjunction with the accompanying drawings in which.

DETAILED DESCRIPTION

In accordance with one embodiment of the invention, the marking process performed by each of the parallel collector threads is split into two parts. During the first part, the marking process performed by a thread pops objects off the local mark stack associated with the thread and scans these objects for references. Scanning for references in a given object involves primarily simply setting bits in local mark-cache entries. The second part of the process pushes objects on the mark stack and updates the global bitmap. However, the second part is only performed when a mark-cache entry is evicted or the thread finishes its marking process (when the local mark stack is empty.) This two-part approach has the effect of reducing the frequency with which the global bitmap is examined, allows the effects of marks to be aggregated, and reduces the likelihood that the mark stack will overflow. It also makes the use of atomic operations more economical by reducing their frequency and guarantees that objects are uniquely claimed for subsequent processing.

In addition to aggregating the effects of marking in the mark-cache, the inventive approach also other benefits. First, it provides a natural point at which to aggregate information during the processing of bitmap entries. For example, in another embodiment, information can be summarized when scanning each object. In particular, the heap can be divided into fixed sized chunks and information aggregated concerning how many objects are alive in each chunk as well as the range of addresses seen in the chunk.

Second, the mark-cache can be used to guide the scanning process. Specifically, by using the address of the last object scanned as the starting index into the mark-cache, better cache locality is achieved because adjacent entries in the mark cache tend to identify memory blocks that are also located close by in memory. In one embodiment, after choosing the starting index, the process continues by simply iterating in a forward direction. In other embodiments, a windowing scheme can be used to choose the nearest of N nearby entries.

Figure 1A:
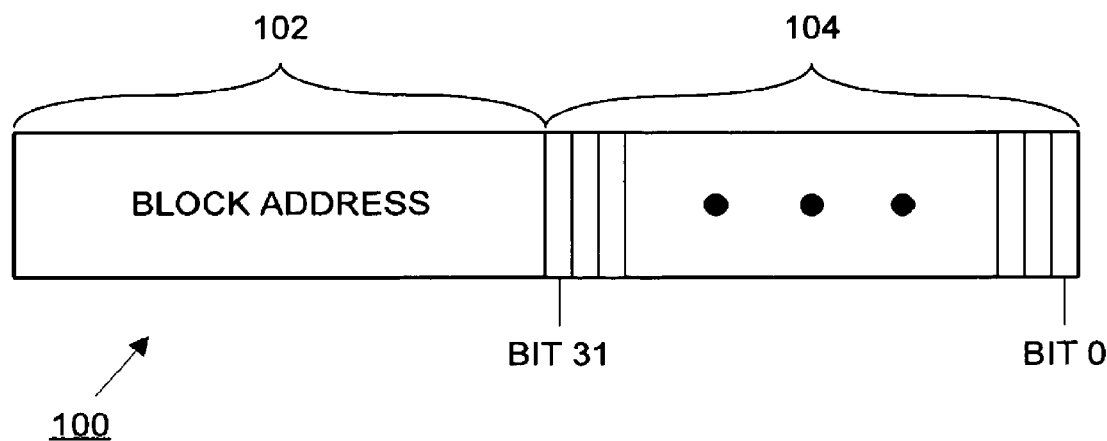
FIG. 1A is a block schematic diagram showing an illustrative arrangement for a mark-cache entry for a computer system with a 32-bit address space.
Figure 1B:
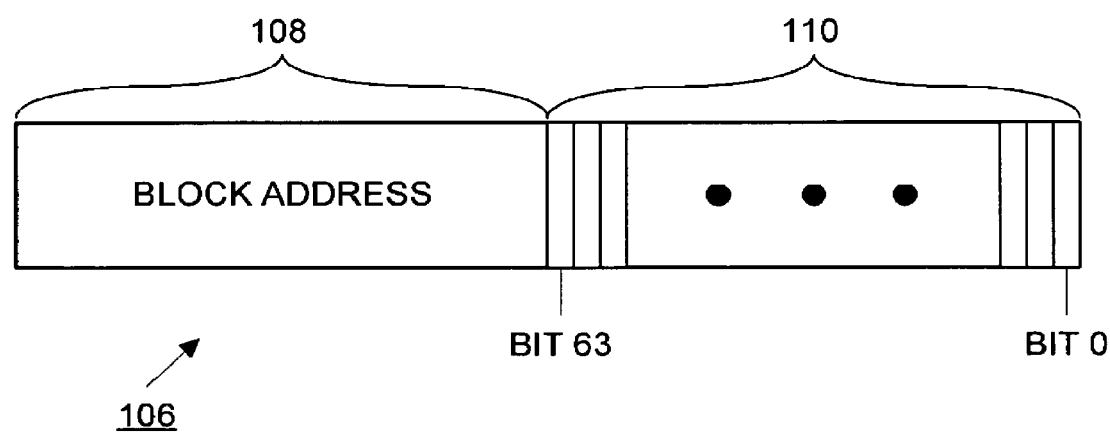
FIG. 1B is a block schematic diagram showing an illustrative arrangement for a mark-cache entry for a computer system with a 64-bit address space.

As previously mentioned, in one embodiment, each mark-cache entry is a reference-bitmap that represents a small contiguous block of memory and comprises a block address which indicates the starting address of the block and a set of bits that indicate the marked/unmarked status of objects in the block. The bits of each entry are grouped into one or more, typically 8-, 16-, 32-, or 64-bit, words. Given a particular word size in bits, it is common for the number of bits in an entry to be a multiple of this size. The size of a memory block is then the product of the number of bits in the entry and the unit of memory determined by the alignment constraints on objects. For example, FIGS. 1A and 1B illustrate sample reference-bitmaps for use with single 32-bit and 64-bit words. For example, the reference-bitmap 100 shown in FIG. 1A is comprised of a block address 102, which is the address of the beginning of the block, and a bitmap section 104. Reference bitmap 100 assumes that the memory block size is 128 bytes and that objects are aligned to 32-bit word boundaries. Thus, each object has a minimum size of four bytes and, accordingly, at most 32 such objects could be resident in the 128 byte memory block. The 32 objects are each assigned a bit in the bitmap section 104 to indicate their marked/unmarked status. The mark bits 104 are indexed for a given object by taking the object's starting address, dividing the address by the minimum unit of memory for each bit (here, four bytes or one 32-bit word), and masking off the lowest sequence of N bits from this result where N is the log(base 2) of the number of mark bits stored in a mark-cache entry (here, with 32 bits, N is 5). With the reference-bitmaps constructed as shown in FIG. 1A, a per-thread mark-cache consists of a predetermined number of reference-bitmaps, for example, 256 reference bitmaps, so that each mark-cache covers a heap area of 32 KB for its associated thread.

In a similar manner, FIG. 1B assumes that the minimum unit of memory will be eight bytes instead of four, and that 64 bits are tracked per entry. Together, these choices yield a memory block size of 512 bytes. Reference bitmap 106 also assumes that objects are aligned to 64-bit word boundaries. The reference bitmap 106 shown in FIG. 1B includes a block address 108, which is the address of the beginning of the block, and a bitmap section 110. Objects are each assigned a bit in the bitmap section 110 to indicate their marked/unmarked status. In this case, a mark-cache constructed from 256 reference-bitmaps would also cover a heap area of 128 KB for the associated thread.

Figure 2:
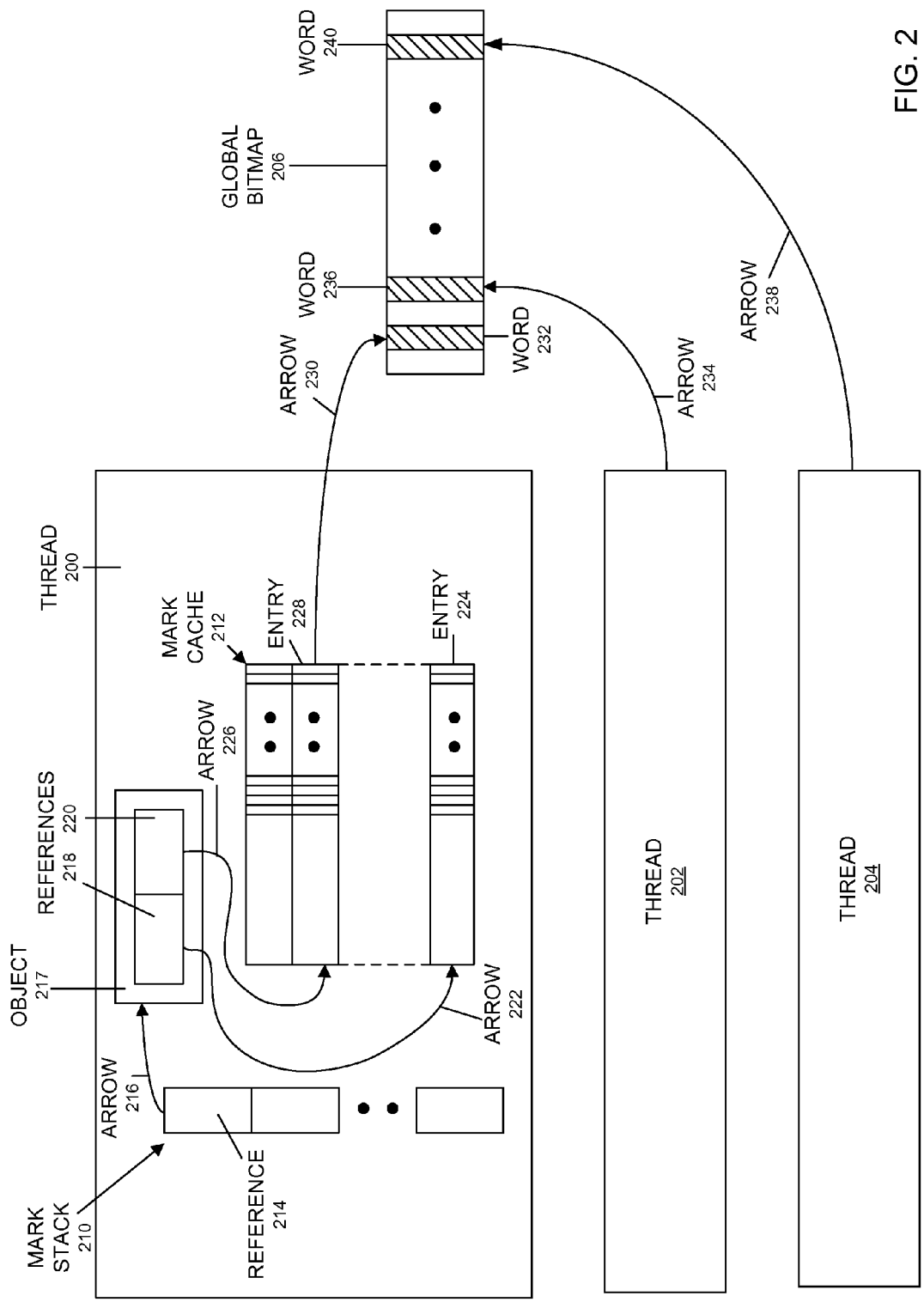
FIG. 2 is a block schematic diagram illustrating a marking operation conducted in accordance with one embodiment of the present invention.
Figure 3A:
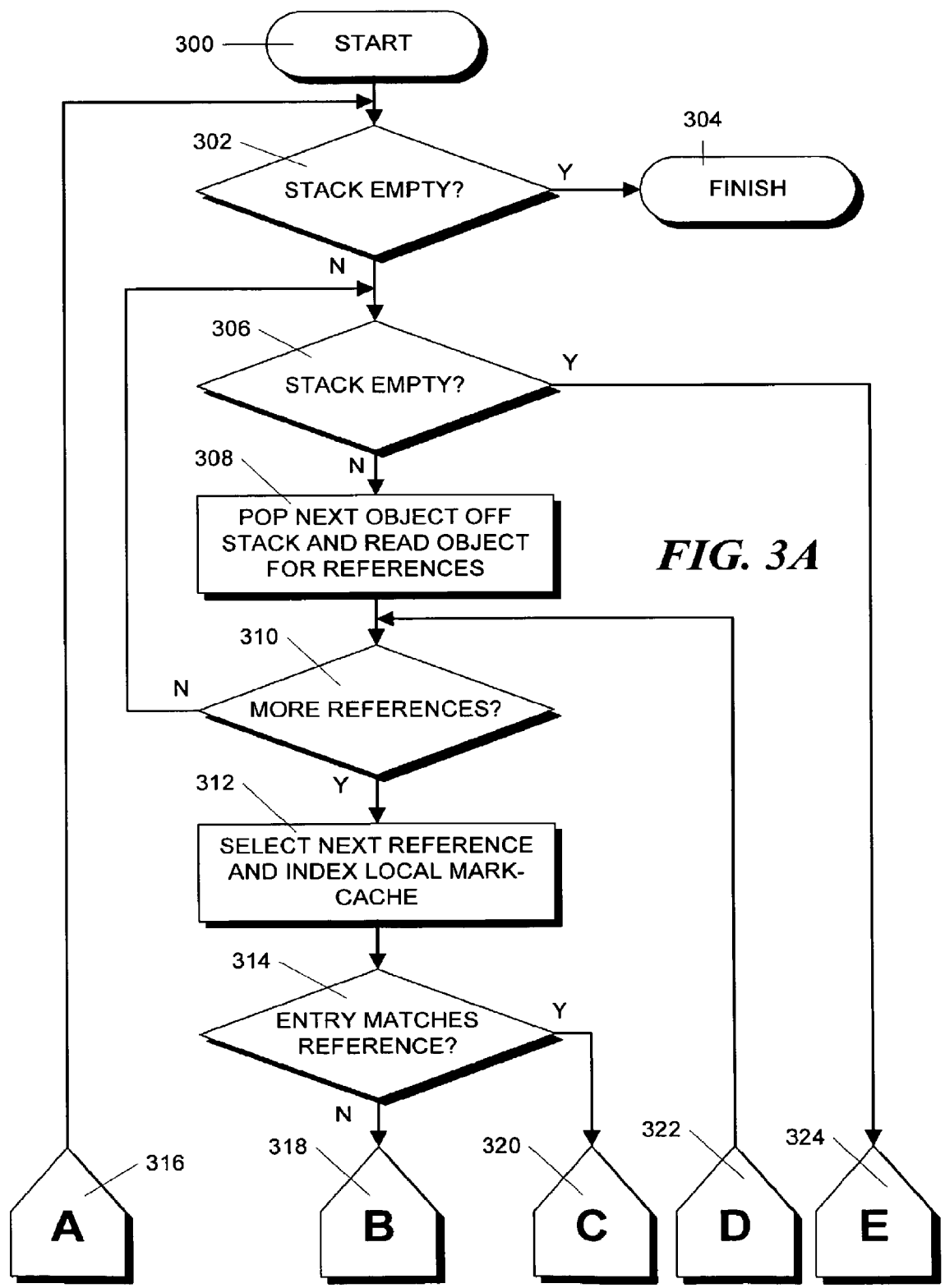
FIGS. 3A, 3B and 3C, when placed together, form a flowchart showing the steps in an illustrative process performed by a thread for marking objects in the local mark-cache associated with the thread.
Figure 3B:
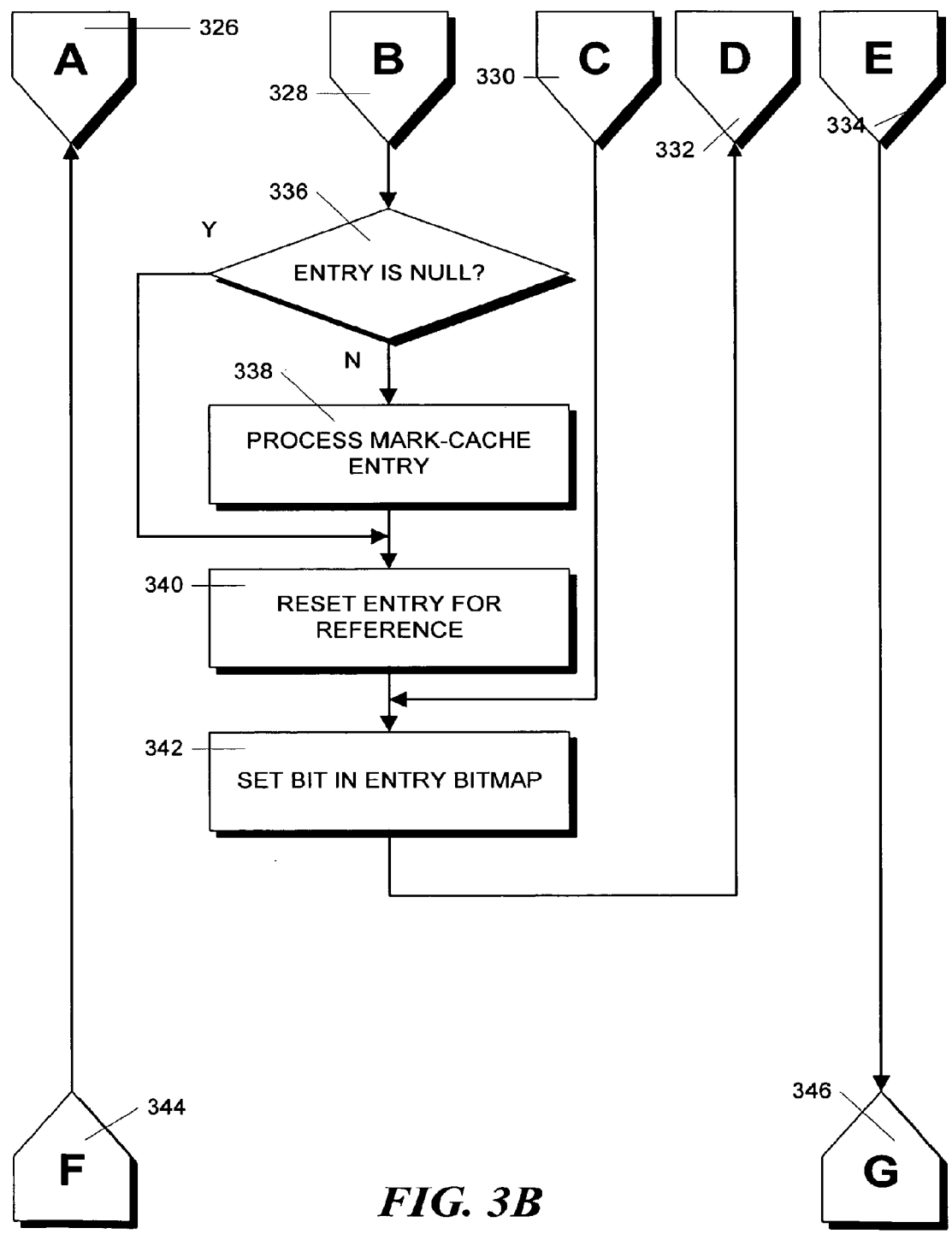
Figure 3C:
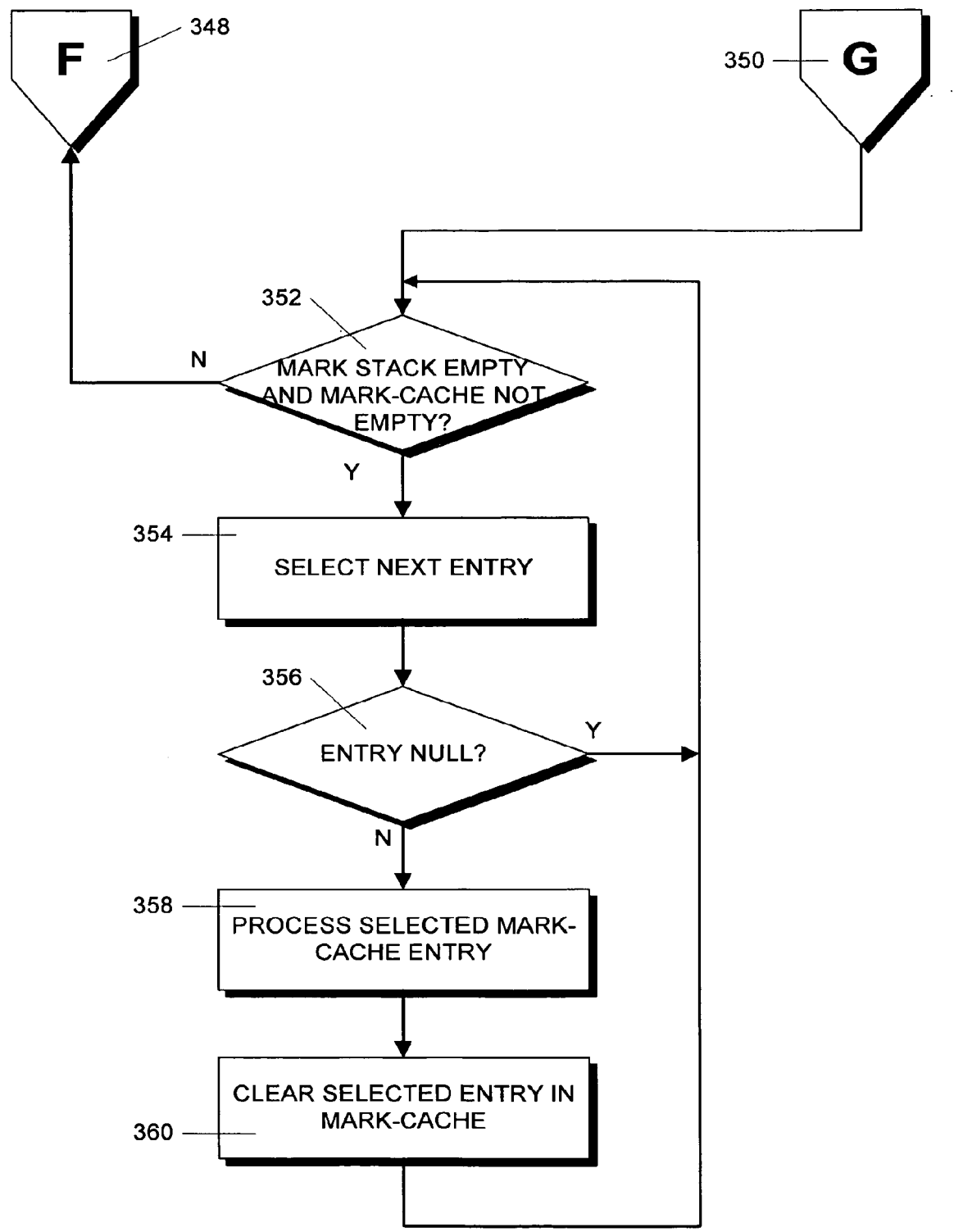

With the mark-cache constructed as set forth in FIG. 1A or 1B, the marking process is shown in schematic form in FIG. 2. The steps in the process are set forth in the flowchart formed by placing FIGS. 3A-3C together. In particular, FIG. 2 shows the marking process being performed by three threads 200, 202 and 204. Threads 202 and 204 perform essentially the same process as thread 200 and so will not be discussed in detail further herein. The marking process uses two per-thread structures and a single global bitmap. The per-thread structures include a local mark stack 210 and the aforementioned mark-cache 212. Since these are per-thread structures, operations can be performed without regard to the actions of other threads. The global bitmap 206 is used by all threads and operations are performed atomically on it.

For thread 200, the marking process starts in step 300 and proceeds to step 302 where a determination is made whether the mark stack 210 is empty. The process operates with an outer loop and two inner loops and the determination at step 302 is part of the outer loop. If all objects have been processed, the process is finished as set forth in step 304. However, normally, at the start of the process, the mark stack would contain objects obtained by examining the roots of the application threads, such as the registers and program stack, so that the mark stack 210 would normally contain objects. If, in step 302, it is determined that the mark stack is not empty, then, in step 306, a second check is made for the first inner loop whether the mark stack 210 is empty. If the mark stack 210 is not empty, then, in step 308, the next object on the stack is popped off and examined for references to other objects that it may contain. This latter operation is illustrated schematically in FIG. 2 where a reference 214 to the object 217 is popped off stack 210 as illustrated schematically by arrow 216.

In step 310, a determination is made whether additional references exist. If no further references exist, the process returns to step 306, where a determination is made whether the mark stack 210 is empty and, if not, the next object is popped off.

If, in step 310, it is determined that additional references that have not been processed exist in the object under examination, then, in step 312, the next reference is selected and the reference address is used to index the mark-cache 212. For example, in FIG. 2, object 217 contains references 218 and 220. In step 312, reference 218 is used to index the mark-cache 212 and select entry 224 as indicated schematically by arrow 222. The indexing is performed by selecting certain bits from the address and using these bits to index into the mark-cache 212. For example, in one implementation, the selection of bits to index the mark-cache is based on extracting the log(cache-size) bits above the log(entry bitmap size) bits used to index the mark bits of an entry. With this implementation, assume a 256-entry mark-cache with 32 mark bits for each entry, single-word alignment, and that the bits in the object address being recorded are numbered from 0 to 31 (least to most significant). With these assumptions, bits 0 and 1 are ignored, bits 2 through 6 are used to index the mark bits in the entry and bits 7 through 14 are used to index the mark-cache and find the correct entry.

In step 314, a determination is made whether the entry 224 matches the reference. In particular, the reference address is compared to the block address recorded in the entry 224 to determine if the reference address falls within the memory block starting at the block address identified by the current contents of entry 224 in mark-cache 212.

If the entry does match the reference, the process then proceeds, via off-page connectors 320 and 330, to step 342 where a bit is set in the bitmap portion of the mark-cache entry using additional address bits to index into the bitmap. In particular, the bitmap portions of the mark-cache entries contain bits indicating objects that are known to be reachable. Those objects may or may not yet be marked in the global marking bitmap 206 and may or may not be marked in the mark caches of other marking threads. However, at this stage the process simply records locally those objects known to be reachable in the local mark-cache 212.

The process then returns, via off-page connectors 332 and 322, back to step 310 where a determination is made whether further references exist in the object under examination and remain to be processed. For example, in FIG. 2, the next reference 220 in the object 217 would be used to index the mark-cache 212 to select entry 228 as indicated schematically by arrow 226 and as set forth in step 312. In step 314, a determination is made whether the indexed entry 228 matches the reference. Assuming that the entry does not match the reference, the process proceeds, via off-page connectors 318 and 328 to step 336 where a determination is made whether the entry is null, indicating that no previous information has been entered. If so, the process proceeds to step 340 where the entry is reset for the reference by setting the block address information for the entry to identify the starting address of the block covering the reference address. Then, in step 342, selected bits of the reference address are used to index into the bitmap portion of the entry and set the appropriate bit. The process then returns, via off-page connectors 332 and 322 back to step 310 to examine the object for additional references.

Assuming in step 336, it is determined that the indexed entry is not null, then information exists in the entry that was previously entered for another memory block. In this case, a collision occurs and the existing entry must be evicted in order to make room for the new information. Eviction involves updating the global bitmap with the information in the mark-cache entry 228 as indicated schematically by arrow 230. In particular, as shown in FIG. 38, the process proceeds to step 338 where the indexed mark-cache entry is processed to update the global bitmap 206 with the entry information. After the global bitmap has been updated, in step 340 the entry is reset for the new information and, in step 342, the appropriate bit is set. The process then continues to examine references in the manner described above.

Figure 4:
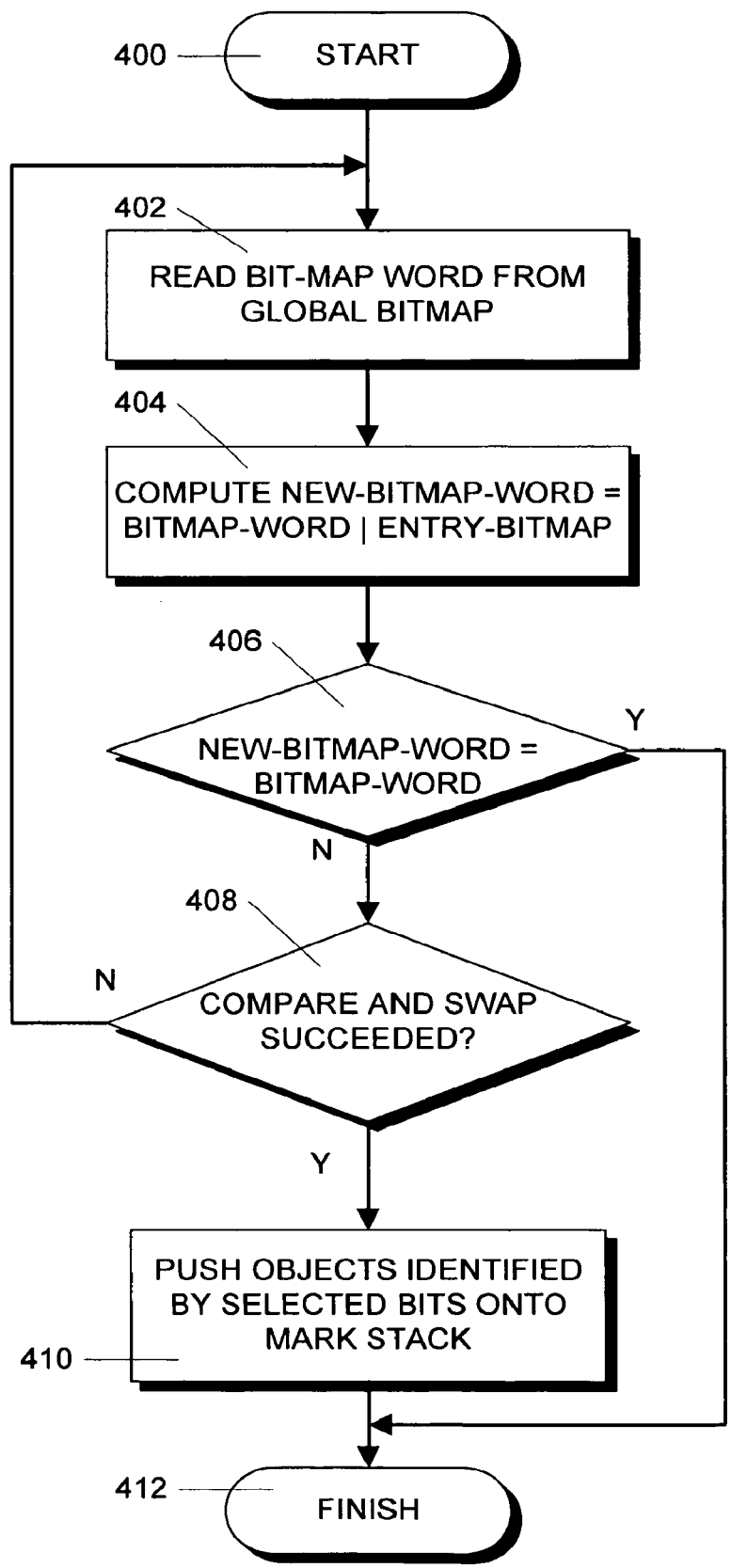
FIG. 4 is a flowchart showing the steps in an illustrative process for processing mark-cache entries in order to update the global bitmap.

The process for updating the global bitmap is illustrated in FIG. 4. This process begins in step 400 and proceeds to step 402 where the block address of the evicted entry is used to read a bitmap-word from the global bitmap. In step 404, a new bitmap word is computed by bitwise ORing the bit-map word read from the global bitmap with the bitmap portion of the evicted mark-cache entry 228. Then, in step 406, a test is performed to determine if the newly computed bitmap word is equal to the bitmap word. If the two words are equal, then all of the recorded marks in the mark-cache entry have already been recorded in the global bitmap. In this case, no update is necessary and the process proceeds to finish in step 412.

Alternatively, if, in step 406, it is determined that an update is necessary, the update is performed using an atomic operation. In this disclosed embodiment a compare-and-swap operation is used, however, other well-known atomic operations, such as some variant of a load-linked/store-conditionally (LL/SC) operation could also be used. In particular, in step 408, a typical compare-and-swap operation atomically compares the contents of a global bitmap word with a bitmap value obtained by previously reading that word. If the contents and the value are equal, the contents of the word are updated with the new computed bitmap word and the original contents of the global bitmap word are returned by the compare-and-swap operation.

If the compare-and-swap operation does not succeed then steps 402-406 are repeated until success is achieved. Once the global bitmap has been updated, then the process proceeds to step 410 where reachable objects that have not been scanned are pushed onto the local mark stack for subsequent scanning. The simplest approach to identifying these reachable objects is to push those objects whose bits are set in the entry-bitmap. However, this approach may cause objects to be pushed on multiple mark stacks and may later result in duplicate scanning of these objects, and so we employ an improved technique that combines the information in the local entry-bitmap and the prior value of the global bitmap-word that has been successfully updated. In particular, these reachable objects are identified by the bits set in the bitwise AND of the entry-bitmap with the bitwise negation of the original contents of the global bitmap-word. The process then finishes in step 412. The result is that a word 232 in the global bitmap 206 is updated.

Operation continues in the manner discussed above until the mark stack 210 becomes empty as detected by step 306. At this point any entries in the mark-cache 212 that have not been used to update the global bitmap are then processed. In particular, the process proceeds from step 306, via off-page connectors 324, 334 and 346, 350 to step 352 where a determination is made whether the mark stack 210 is empty and the mark-cache 212 is not empty. If so, then the process proceeds to step 354 where the next mark-cache entry is selected. In step 356, a determination is made whether the selected entry has been cleared (its recorded block address is NULL.) If the entry has been cleared then the process proceeds back to step 352 to determine whether further entries remain to be processed.

Alternatively, if, in step 356, it is determined that the mark-cache entry has not been cleared, then in step 358, the entry is processed using the process set forth in FIG. 4 and discussed above. In step 360, the selected entry is cleared. The process then proceeds back to step 352 to determine whether entries remain to be processed or whether new objects were pushed onto the mark stack during the entry processing. If no new mark-cache entries remain to be processed or new objects have been pushed onto the mark stack, as detected in step 352, then the process proceeds, via off-page connectors 348,344 and 326, 316, back to step 302 to determine whether the mark stack 210 is empty. If further objects have been pushed onto the stack, then these objects are processed as described above. If no new objects have been pushed onto the stack, then the process finishes in step 304.

Operation in each collector thread continues as described above in parallel. For example, collector thread 202 may process objects on its local mark stack and update word 236 in the global bitmap 206 using an atomic operation, as discussed above, and indicated by arrow 234. Similarly, collector thread 204 may process objects on its local mark stack and update word 240 in the global bitmap 206 using an atomic operation, as discussed above, and indicated by arrow 238.

As described, the inventive concepts will also work with parallel collectors that use work-stealing. In this case, collection threads that attempt to steal work are allowed to poach entries directly from the mark-caches of other threads. To poach an entry, the stealing thread reads the contents and proceeds to perform the work by processing the entry. When the poached thread later processes that entry, most, or all, of the marks will have already been set in the global bitmap, thereby obviating the processing that would ordinarily have to be performed by the poached thread.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless 12. techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, more complicated strategies for managing collisions in the mark-cache could be used, including some level of set associativity or a victim cache. In another embodiment, instead of the local mark stack holding only object addresses, as disclosed in the embodiment discussed above, either a pair of mark stacks or a mark stack with mixed entries could be used. In this later case, mark stack entries could either be objects to scan or evicted entries from the mark-cache, further aggregating work and reducing the possibility of overflow of the mark stack. The order of the process steps may also be changed without affecting the operation of the invention. Other aspects, such as the specific process flow, as well as other modifications to the inventive concept are intended to be covered by the appended claims.

What is claimed is:

1. A method for performing garbage collection, comprising:
   obtaining a first reference bitmap comprising a block address and a plurality of mark bits;
   obtaining a first reference;
   identifying a mark bit of the plurality of mark bits based on the first reference;
   comparing an address associated with the mark bit and the first reference to generate a comparison;
   selecting an existing word from a global bit map based on the block address and the comparison;
   calculating a new word based on the plurality of mark bits and the existing word;
   replacing the existing word in the global bit map with the new word;
   reclaiming a block of memory for reuse based on the global bit map after replacing the existing word;
   performing a bitwise negation operation on the existing word to generate a negated existing word;
   performing a bitwise AND operation on the negated existing word and the plurality of mark bits to generate a result; and
   identifying a second reference based on the result, wherein the second reference is reachable.

2. The method of claim 1, wherein calculating the new word comprises:
   performing a bitwise OR operation on the existing word and the plurality of mark bits.

3. The method of claim 1, further comprising:
   setting the mark bit; and
   replacing the block address based on the first reference after calculating the new word.

4. The method of claim 1, wherein the block of memory is identified as unreachable in the global bit map.

5. The method of claim 1, further comprising:
   obtaining the second reference; and
   obtaining a second reference bitmap.

6. The method of claim 5, wherein the first reference bitmap belongs to a first private mark cache associated with a first thread.

7. The method of claim 6, wherein the second reference bitmap belongs to a second private mark cache associated with a second thread.

8. The method of claim 6, wherein the second reference bitmap belongs to the first private mark cache.

9. A non-transitory computer readable medium storing instructions for performing garbage collection, the instructions comprising functionality to:
   obtain a first reference bitmap comprising a block address and a plurality of mark bits;
   obtain a first reference;
   identify a mark bit of the plurality of mark bits based on the first reference;
   compare an address associated with the mark bit and the first reference to generate a comparison;
   select an existing word from a global bit map based on the block address and the comparison;
   calculate a new word based on the plurality of mark bits and the existing word;
   replace the existing word in the global bit map with the new word;
   reclaim a block of memory for reuse based on the global bit map after replacing the existing word;
   perform a bitwise negation operation on the existing word to generate a negated existing word;
   perform a bitwise AND operation on the negated existing word and the plurality of mark bits to generate a result; and
   identify a second reference based on the result, wherein the second reference is reachable.

10. The non-transitory computer readable medium of claim 9, the instructions to calculate the new word comprising functionality to:
    perform a bitwise OR operation on the existing word and the plurality of mark bits.

11. The non-transitory computer readable medium of claim 9, the instructions further comprising functionality to:
    set the mark bit; and
    replace the block address based on the first reference after calculating the new word.

12. The non-transitory computer readable medium of claim 9, wherein the block of memory is identified as unreachable in the global bit map.

13. The non-transitory computer readable medium of claim 9, the instructions further comprising functionality to:
    obtain the second reference; and
    obtain a second reference bitmap.

14. The non-transitory computer readable medium of claim 13, wherein the first reference bitmap belongs to a first private mark cache associated with a first thread, and wherein the second reference bitmap belongs to a second private mark cache associated with a second thread.

15. A system for performing garbage collection, comprising:
    a block address identifying a block of memory; and
    a first thread configured to:
    obtain a first reference bitmap comprising the block address and a plurality of mark bits;
    obtain a first reference;
    identify a mark bit of the plurality of mark bits based on the first reference;
    compare an address associated with the mark bit and the first reference to generate a comparison;
    select an existing word from a global bit map based on the block address and the comparison;
    calculate a new word based on the plurality of mark bits and the existing word;
    replace the existing word in the global bit map with the new word;
    reclaim the block of memory for reuse based on the global bit map after replacing the existing word;
    perform a bitwise negation operation on the existing word to generate a negated existing word;
    perform a bitwise AND operation on the negated existing word and the plurality of mark bits to generate a result; and identify a second reference based on the result, wherein the second reference is reachable.

16. The system of claim 15, wherein the first thread is further configured to:
   identify a mark bit of the plurality of mark bits based on the first reference; and
   compare an address of the plurality of addresses represented by the mark bit with the first reference.

17. The system of claim 15, wherein the first thread is further configured to push the second reference on a first mark stack.

18. The system of claim 17, further comprising:
   a second mark stack; and
   a second thread associated with the second mark stack.

* * * * *